Dec. 5, 1961
C. CAFLISCH ET AL
3,012,007
SYNTHETIC RESIN COMPOUND AND METHOD OF PRODUCING AND USING THE SAME
Filed June 20, 1958
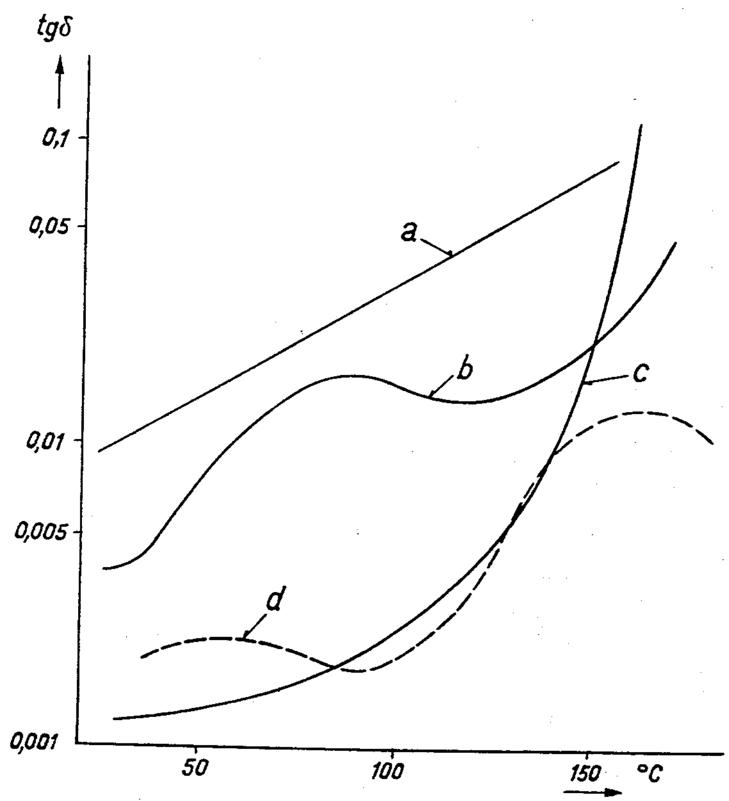
INVENTORS:
CHRISTIAN CAFLISCH
and FRANZ KNAPP
by Frederick Breitenfeld
Attorney United States Patent Office 3,012,007

Patented Dec. 5, 1961

3,012,007

SYNTHETIC RESIN COMPOUND AND METHOD OF PRODUCING AND USING THE SAME

Christian Caflisch, Wallisellen, and Franz Knapp, Zurich, Switzerland, assignors to Oerlikon Engineering Company, Zurich, Switzerland, a corporation of Switzerland Filed June 20, 1958, Ser. No. 743,457

Claims priority, application Switzerland Aug. 20, 1956

4 Claims. (Cl. 260—47)

This invention relates to a thermoplastic resin compound which contains the reaction product of an epoxy resin and a titanium tetra ester. The invention also relates to a method of producing the aforesaid synthetic resin compound, and to the use of the same.

The present application is a continuation-in-part of our co-pending application Serial No. 674,707, filed July 29, 1957, now abandoned.

Numerous synthetic resins and mixtures of synthetic resins are known which are primarily used for producing high voltage insulating material. Since mica is used as the main dielectric medium in the form of splittings or paper (Samica), binders are used which as far as possible fill up all hollow spaces in the dielectric material and cause the mica laminae to adhere firmly.

It has heretofore been proposed to use unsaturated polyester resins for the aforementioned purpose. In one known method the mica is stuck on a supporting foil with the aid of a volatile organic liquid and is then cut up into tapes. These tapes are wound about a conductor to be insulated. The volatile binder is then removed under the action of heat in vacuo, whereupon vacuum impregnation is effected with a polyester resin hardening at 130° C. within 30 minutes without giving off volatile constituents. If volatile constituents were to be given off, the insulating material would become unusable as a consequence of the blister formation which would occur.

According to another known method, a mixture of an epoxy resin and an acidic saturated polyester is used as a binder. Furthermore, mixed polyester polymers and polyisocyanate insulating compositions have been proposed as binders.

The disadvantages of the aforementioned synthetic resins and combinations thereof consist in their relatively low heat resistance and relatively heavy dissipation factors at temperatures above 125° C. An increase in the hardness and in the stability of the chemical constituents and an improvement of the dielectric properties are achieved by a known synthetic resin combination which consists of butyl titanate and epoxy resins. However, such a combination requires stablization of the titanate so that an instantaneous gelatinization of the epoxy resin can be prevented. It is necessary for the epoxy resin to be present as a solution and the butyl titanate stabilized with an aldehyde or ketone alcohol in complex form, before the two components are mixed. Under the aforementioned conditions the epoxy resin does not have the faculty of cross-linking with one of the known curing agents without giving off volatile constituents. Consequently it can neither be used as an impregnation nor as a casting resin.

In order to obviate the defects of the hitherto known methods, according to the invention we have produced a thermoplastic resin product containing the product of reaction, under heat and vacuum, of a mixture of ingredients consisting essentially of (1) a complex epoxy resin containing epoxy groups and less than two hydroxy groups or none at all per molecule, and comprising a polyether derivative obtained by reacting epichlorhydrin with a polyhydric organic compound selected from the class consisting of polyhydric alcohols and phenols containing at least two phenolic hydroxy groups. The presence of one or no free hydroxy groups in the epoxy resin avoids the danger of very rapid gelatinization of the completed resinous complex containing the titanium tetraalkylester. The epoxy resin is then reacted with (2) a titanium tetraalkylester. This thermoplastic resin product may be cured into hard, rigid, thermoset solids by means of many well-known curing agents used for epoxy resins, whereby no volatiles are given off during cure, and the cured thermoset resin product has a dissipation factor below 0.025 up to a temperature of 180° C.

As specific examples of epoxy resins to be particularly suitable for use in accordance with this invention, are the following resins having the indicated epoxy equivalent between 165 and 400, sold under the name of Araldite resins by the Ciba Co. and Epon resins by Shell Chemical Corp.:

| | Epoxy equivalent (grams of resin containing one gram-equivalent of epoxide) |
|---|---|
| Epon 1062 | 165 |
| Araldite 6020 | 190 |
| Epon RN-48 | 200 |
| Araldite D | 240 |
| Epon 834 | 250 |
| Epon 864 | 335 |

The epoxy resins have the following structural formula:

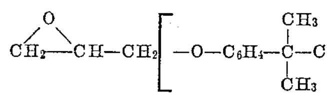

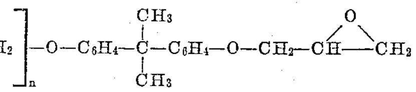

$$\overset{O}{\overbrace{CH_2-CH}}-CH_2\left[-O-C_6H_4-\underset{CH_3}{\overset{CH_3}{C}}-C_6H_4-O-CH_2-\overset{OH}{CH}-CH_2\right]_n-O-C_6H_4-\underset{CH_3}{\overset{CH_3}{C}}-C_6H_4-O-CH_2-\overset{O}{\overbrace{CH-CH_2}}$$

wherein $n$ equals zero or one. By epoxy equivalent as used herein is meant the quantity of a material which contains one gram-mole of epoxy groups.

The phenol used in making the resin having the above formula is 2-2-bis (4-hydroxy-phenyl) propane.

Other polyhydric alcohols and phenols adapted for the present invention are glycerol, glycols and polyglycols of ethylene and propylene, polyhydroxy naphthalenes, cresol, catechol, hydroquinone, and the like.

The alkyl groups of the titanium esters include ethyl, propyl, butyl, pentyl, hexyl, heptyl, octyl, nonyl, decyl, undecyl, dodecyl, and others. The proportions by weight of the epoxy resins to the titanium esters are about 100 parts of resins to about 0.1 to 40 parts of the esters.

The synthetic resin combination according to the invention is characterized in particular by the fact that it can be kept without gelatinization, the OH groups present in the epoxy resins are esterified completely, so that any further tendency to gelatinization of the reaction mixture is excluded. The storable titanium-epoxy resin may be converted to the substantially thermoset stage like the known epoxy resins by employing acids, polybasic carboxylic acid anhydrides, amines and amino acids as cure accelerators, without giving off volatile constituents. This cured resin combination has in addition to high heat-resistance also a low dissipation factor at temperatures up to 200° C.

Typical of the acid curing agents are citric acid, fumaric acid, maleic anhydride, phthalic anhydride, and the amino acid glycine. Diethylenetriamine and phenylene diamine are typical amine curing agents.

The accompanying drawing shows a diagrammatic summary, in which the logarithmically plotted dissipation factor $tg\delta$ is reproduced as a function of the temperature for various synthetic resins. In this regard, curve *a* relates to an epoxy resin cured with an acidic saturated polyester resin (U.S. Patent 2,707,204—Cl. 174–110) (French Patent 1,071,178, Gr. 12/Cl. 6, General Electric), curve *b* to unsaturated polyester resin (Swiss Patent 262,559, Cl. 41, Westinghouse), curve *c* to epoxy resin Araldite F with Hardener 901 heat-cured, and curve *d* to the titanium-epoxy resin according to the invention.

It can be seen that the known epoxy-polyester resin and the epoxy resin exhibit an angle of loss or dissipation factor which constantly increases with temperature. In the case of polyester resin, also, the value of the dissipation factor rapidly increases from about 140° C. upwards. In contrast thereto, the synthetic resin combination of the present invention even shows a reduction in the dissipation factor at temperatures of about 160° C., so that the advantage of the new synthetic resin is particularly apparent in the case of high temperatures.

In order that those skilled in the art many better understand how the present invention may be practiced, the following examples are given by way of illustration and not by way of limitation:

*Example 1.*—100 parts by weight of Epon 828 (having an epoxy equivalent between 185 and 205) containing about 75% of an epoxy resin according to the structural formula where *n* equals zero and 25% where *n* equals one, are heated up to 140° C., and the last traces of water and low molecular impurities are removed with the aid of reduced pressure. Six parts by weight of tetrabutyl titanate are added with agitation, the temperature being generally not above 145° C. The butyl alcohol derived from the titanium ester is removed by subjecting the reaction mass to a temperature between 80° and 180° C., and under vacuum eliminating moisture and the alcohol. The thermoplastic epoxy titanate resin is then cooled to room temperature. This viscous liquid resin is storable without gelatinization.

*Example 2.*—100 parts by weight of the thermoplastic epoxy titanate resin produced according to Example 1 are heated to 80° C. To the warmed resin are added with agitation 66 parts by weight of dodecenylsuccinic anhydride, a light, yellow, clear, viscous oil, as a curing agent. The temperature of this mixture is held for 4 hours at 125° C. to cure the resin into a hard, rigid, thermoset solid, whereby no volatiles are given off during cure. The cured thermoset resin product has a dissipation factor below 0.025 until up to 180° C. as follows:

| Temperature: | $tg\delta$ |
|---|---|
| 20° C. | 0.001 |
| 110° C. | 0.023 |
| 150° C. | 0.006 |
| 180° C. | 0.020 |

*Example 3.*—100 parts by weight of the thermoplastic epoxy titanate resin produced according to Example 1 are heated to 40° C. In the meantime 90 parts of an unsaturated polymerizable polyester (alkyd) resin, a reaction product derived from a polyhydric alcohol and a polybasic acid, at least one of which contains a doubly-bonded pair of carbon atoms, sold under the name of Palatal $P_6$ by Badische Anilin- & Soda-Fabrik A.G., are heated and the temperature maintained at 130° C. 30 parts by weight of endo-cis-Bicylo (2.2.1)-5-heptene-2,3-dicarboxylic anhydride, sold under the name of Nadic Anhydride by the National Aniline Division, with a melting point of 164° C. are dissolved in the warmed polyester resin with agitation. After 20 minutes the clear solution is mixed with the preheated epoxy titanate resin, and the mixture with a final temperature of 70 to 80° C. is ready for an impregnation. After curing at 110° C. for 6 hours and an additional heat-treatment for 16 hours at 160° C., whereby no volatiles are given off during cure, the thermoset resin has dissipation factors as follows:

| Temperature: | $tg\delta$ |
|---|---|
| 20° C. | 0.003 |
| 80° C. | 0.004 |
| 110° C. | 0.024 |
| 145° C. | 0.014 |
| 180° C. | 0.024 |

The alkyd resin is of a known type. It consists of, say, 1 mole of glycol combined with 1.0 mole of maleic anhydride; 2 moles of glycerine combined with 2.8 moles of fumaric anhydride; 2 moles of allyl alcohol combined with 1.0 mole of phthalic anhydride; or 1 mole erythrol combined with 3.2 moles of adipic, azelaic or sebacic acid. The resin serves as a solvent for hardeners having high melting points; it hardens at the higher temperatures without impairing its good $tg\delta$ values.

*Example 4.*—100 parts by weight of the thermoplastic epoxy titanate resin produced according to Example 1 are heated to 65° C. To the warmed resin are added with agitation 14 parts by weight of m-phenylenediamine, a crystalline powder with a melting point at 62° C. The resulting clear liquid cures within one hour at 100° C. to a thermoset, tough casting.

*Example 5.*—For a high-tension insulation, a "Samica glas-tape" is wound around the copper bar of a generator. The electrical conductor with the continuous taping is heated and the temperature maintained at 120° C. for 3 hours under vacuo to remove all moisture. The vacuum impregnation is effected with the resin mixture according to Example 2, the temperature in the autoclave and of the resin being between 60° and 70° C. After curing at a temperature of 165° C. for about 6 hours, whereby no volatiles are given off during cure, the high-tension insulation is thermoset, tough and has dissipation factors as follows:

| Temperature: | $tg\delta$ |
|---|---|
| 20° C. | 0.001 |
| 162° C. | 0.027 |

Many advantages are inherent in the present invention. For instance, the cured product has extremely low $tg\delta$ values at temperatures below about 180° C., much lower than most of the prior art epoxy resins, and these values may even decrease at the high temperatures. The cured product is stable when subjected to heat, retaining its form without distortion. No volatile components are evolved during the curing operation, resulting in a solid which is free from pores, and this contributes to its insulating properties.

The new titanium-epoxy resin can be used in a great variety of ways. It is used with particular advantage as an insulating material. Since its dissipation factor at elevated temperatures is lower than in the case of the substances hitherto used, no perforations can occur due to heat. The new insulating material is preferably used for a class of insulation involving temperatures up to about 160° C.

The solutions of the titanium-epoxy resin which contain an amine or dicarboxylic acid anhydride as hardner, can be treated in the same way as the known products as a binding agent for mica and Samica foil. In this case, after lacquering of the mica, and if necessary also of the carrier, the solvent must be removed by heating. Then the foil or the bands produced therefrom are wound on to the conductor to be insulated, at temperatures of between 20 and 160° C., and thermally hardened without any escape of volatile constituents.

Thinly liquid titanium-epoxy resins adjusted to be cold-or heat-hardenable according to the hardner added, are suitable for use as an impregnation resin. Foils or bands of mica splittings, and also Samica foils or bands, with or without a carrier, are wound cold on to the conductor to be insulated and thereupon dried at elevated temperature in a vacuum. The titanium-epoxy resin together with the hardener is then applied in vacuo and hardened in a compression mould. The impregnation with the titanium-epoxy resin ensures an improvement of the insulation wrapping both from the mechanical and the dielectric point of view.

Since the synthetic resin combination according to the invention has a better heat resistance than known resins, it is advantageously used for the production of castings, for example such as those used for electrical appliances, which are subject to high mechanical and thermal stress. The castings can be constructed either with or without fillers.

The synthetic resin product of the present invention can also be used as a varnishing resin.

Pouring in or impregnating with titanium-epoxy resin is also advantageously carried out in the case of fabric such as glass silk, asbestos, and natural and synthetic fibres.

What is claimed is:

1. A method of making a resinous material which is storable without gelatinizing and curable without evolvement of gas into a thermoset high-voltage insulation material having stability and low dissipation factor when subjected to heat above 125° C., which comprises first making an epoxy resin containing an epoxy equivalent in the range of from 185 to 335 and containing hydroxyl groups, by reacting epichlorhydrin with a dihydric phenol selected from the class consisting of 2-2-bis (4-hydroxyphenyl) propane, catechol, and hydroquinone, then reacting said resin only with a titanium tetra alkyl ester in the proportion by weight of 100 parts of resin to from 0.1 to 40 parts of ester, the alkyl group of said ester having up to 12 carbon atoms, the hydroxyl groups present in the epoxy resin being completely esterified during the course of the reaction with the titanium ester and with liberation of an alcohol, subjecting the reaction mass to a temperature between 80° and 180° C., and under vacuum eliminating moisture and the alcohol derived from the titanium ester, thereby obtaining said curable resin.

2. The method defined in claim 1, in which the titanium tetra alkyl ester is an ester of butyl alcohol.

3. The curable resin resulting from the method defined in claim 1.

4. The curable resin resulting from the method defined in claim 2.

References Cited in the file of this patent

UNITED STATES PATENTS

| | | |
|---|---|---|
| 2,691,004 | Doyle | Oct. 5, 1954 |
| 2,712,535 | Fisch | July 5, 1955 |
| 2,733,222 | Beacham | Jan. 31, 1956 |
| 2,742,448 | Beacham et al. | Apr. 17, 1956 |
| 2,767,158 | Schlenker et al. | Oct. 16, 1956 |
| 2,809,184 | Langer | Oct. 8, 1957 |

OTHER REFERENCES

Shell Technical Bulletin SC: 57–16; Shell Chemical Corporation, Chemical Sales Division (April 1957).